Feb. 11, 1930. C. J. WINKLER 1,746,978

ADAPTER FOR BEARINGS

Filed Nov. 17, 1928

INVENTOR.
CARL J. WINKLER.

BY
ATTORNEYS.

Patented Feb. 11, 1930

1,746,978

UNITED STATES PATENT OFFICE

CARL J. WINKLER, OF INDIANAPOLIS, INDIANA

ADAPTER FOR BEARINGS

Application filed November 17, 1928. Serial No. 320,087.

This invention relates to a bearing structure and particularly to an adapter for adjusting and taking up play due to wear between the bearings and races.

The principal object of the invention relates to an adapter for the above purpose which is so constructed as to combine a resilient spring action with a frictional resistance, whereby the adapter will be caused to expand in such manner as to take up any play in the bearing structure by reason of the spring construction, and will maintain its position by means of the frictional resistance inherent therein.

The principal features of the invention consist in the provision of a pair of collars associated with each other and bearing against one of the bearing races, said collars having cam like engaging surfaces so formed that as the collars are rotated relative to each other, the cam like surfaces will cause a longitudinal expansion thereof against the bearing, and one or more springs so mounted in said collars as to normally exert a relative rotative force therebetween, whereby they will be caused to expand longitudinally under spring pressure and maintain their expanded position by reason of the frictional engagement of their cam surfaces.

The full nature of the invention will be more clearly understood from the accompanying drawings and the following description and claims.

Figure 1:
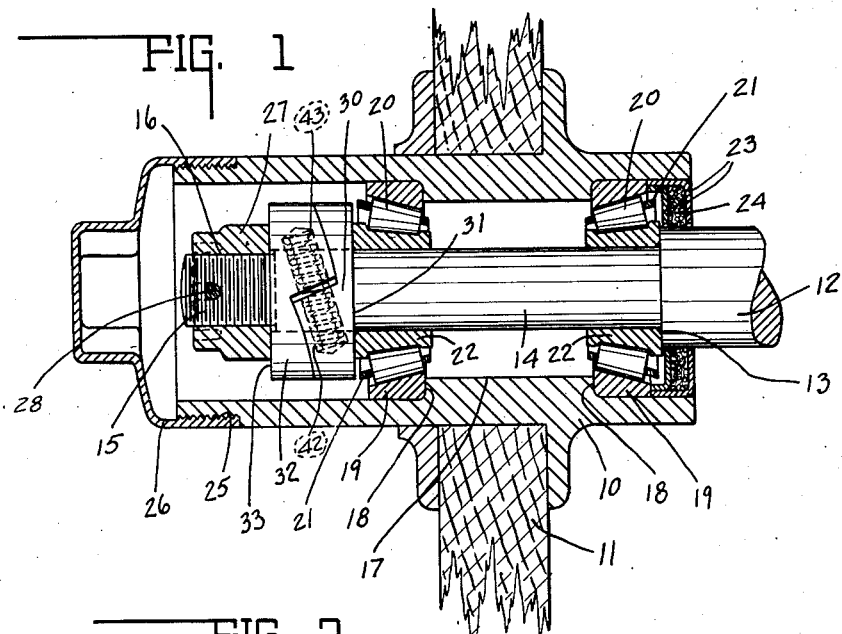
Figure 2:
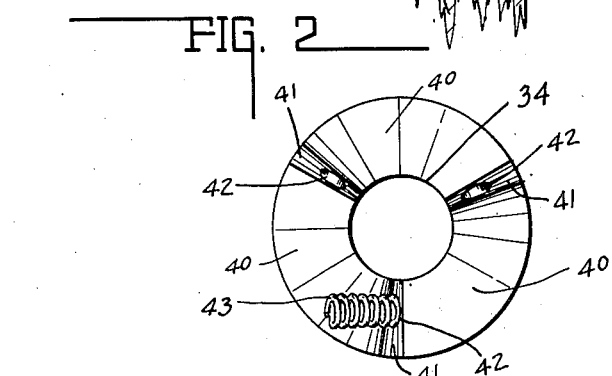
Figure 3:
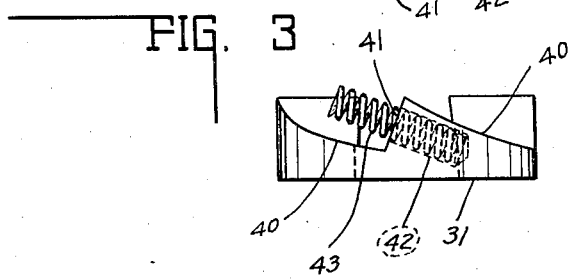

In the drawings, Fig. 1 is a longitudinal sectional view through a bearing construction embodying the invention, parts being shown in elevation. Fig. 2 is an enlarged plan view of one of the adapter collars. Fig. 3 is an elevational view thereof.

In the drawings there is shown a wheel hub 10 having spokes 11 through which the shaft 12 extends, said shaft being provided with the usual shoulder 13 separating the shaft proper from the reduced extension 14 which is provided with a threaded end 15 having a cotter key receiving hole 16 extending transversely therethrough. The interior of the hub is formed with a portion 17 having a reduced diameter forming the shoulders 18 against which the outer bearing races 19 are adapted to abut and be maintained in spaced relation. Mounted in the outer bearing races 19 there are roller bearings 20 provided with the usual spacing ring construction 21, said roller bearings being adapted to run in the inner bearing race 22 which supports the reduced portion 14 of the shaft 12. One end of the hub is closed by a pair of disk plates 23 separated by the packing 24 and the opposite end of the hub is threaded, as at 25, to receive the hub cap 26. Mounted on the threaded end of the shaft, there is a castellated nut 27 and locked in place by the cotter pin 28.

The bearing adapter comprises a pair of collars 30 and 31 rotatably and slidably mounted upon the portion 14 of the shaft 12 and positioned between the nut 27 and the adjacent inner race 22. Said collars are formed with complementary abutting cam surfaces 40 having a relatively gradual incline with respect to the outer faces of the adapter, said cam surfaces being substantially helical in form, whereby upon relative rotation between the collars, there will be a separating movement therebetween to cause the adapter to become elongated. As shown herein, there are three such faces extending about the inner abutting surface of each collar, each of said faces being joined by a relatively short surface 41 extending substantially at right angles thereto, in which the holes or recesses 42 are drilled, said holes extending substantially parallel with the cam surfaces 40. The holes 42 formed in the abutting faces 41 of the respective collars are in alignment for receiving the compression spring 43 therein. The spring 43 is so formed as to exert a rotative force between the collars so that the faces 41 will normally be spaced apart, thereby causing the adapter to be elongated.

Whereas the invention has been herein described with respect to the relative rotation between a pair of collars having cam engaging surfaces, it may be accomplished similarly by a pair of members, one of which is fixed, in threaded engagement with each other, whereby the engaging surfaces of the male and female threads act as cam surfaces for moving one member longitudinally of the other when rotated under spring pressure.

When the spring is compressed, as shown in Fig. 1, the spring tension exerted thereby will tend to cause an elongation of the adapter so that it constantly exerts a pressure upon the inner bearing race 22 and nut 27. This acts to take up any play or looseness in the adjacent bearing caused by wear or the like, and similarly takes up any play in the remote bearing by drawing the shoulder 13 of the shaft against the abutting inner race 22 through the nut 27 against which the adapter bears. Thereby the entire bearing structure is maintained in the proper position and any looseness or play is automatically taken up.

It will be noted the frictional action between the cam surfaces will resist the contraction of the adapter after it has been expanded to take up play in the bearings so that it is not entirely dependent upon spring pressure alone. While the invention herein has been illustrated and described with respect to the roller bearings, it will be understood that it is equally applicable to ball bearings or any similar structure where it is desired to take up play and wear between relatively movable parts.

The invention claimed is:

1. An adapter for bearings comprising a pair of members having complementary cam surfaces in engagement with each other whereby relative rotation between said members will cause an elongation of said adapter, and a spring mounted intermediate and within the periphery of said members for exerting a substantially peripheral rotative force thereon, whereby said members will be urged in a rotative direction with respect to each other.

2. An adapter for bearings comprising a pair of members having a plurality of complementary helical surfaces adapted to engage with each other for causing an elongation of said adapter upon relative rotation between said members, faces formed intermediate said surfaces on each of said members having recesses therein extending substantially parallel with said surfaces, and compression springs mounted in said recesses for normally maintaining said faces in spaced relation and urging said members in a rotative direction for causing the elongation of said adapter.

In witness whereof, I have hereunto affixed my signature.

CARL J. WINKLER.